United States Patent [19]

Tabata

[11] Patent Number: 4,673,156
[45] Date of Patent: Jun. 16, 1987

[54] LIQUID-FILLED TYPE VIBRATION DAMPING STRUCTURE

[75] Inventor: Toshiyuki Tabata, Sagamihara, Japan

[73] Assignee: Nissan Motor Co., Ltd., Yokohama, Japan

[21] Appl. No.: 788,139

[22] Filed: Oct. 16, 1985

[30] Foreign Application Priority Data

Oct. 16, 1984 [JP] Japan ................ 59-216842

[51] Int. Cl.$^4$ ............................. F16M 5/00
[52] U.S. Cl. .................... 248/559; 248/562; 248/636; 248/631; 248/638
[58] Field of Search ......... 248/559, 562, 631, 636, 248/638; 267/140.1, 8 R, 35, 113

[56] References Cited

U.S. PATENT DOCUMENTS

| 4,159,091 | 6/1979 | Le Salver | 267/113 |
| 4,418,895 | 12/1983 | Bertin | 248/636 |
| 4,420,060 | 12/1983 | Kakimoto | 248/631 |
| 4,491,304 | 1/1985 | Kakimoto | 248/636 |
| 4,505,461 | 3/1985 | Kakimoto | 267/140.1 |
| 4,553,744 | 11/1985 | Konishi | 267/140.1 |

FOREIGN PATENT DOCUMENTS

| 3140783 | 4/1983 | Fed. Rep. of Germany ... 267/140.1 |
| 3340152 | 11/1983 | Fed. Rep. of Germany ... 267/140.1 |
| 347247 | 12/1983 | Fed. Rep. of Germany ... 267/140.1 |
| 53-5376 | 1/1978 | Japan . |
| 2041485 | 9/1980 | United Kingdom ............ 267/140.1 |

*Primary Examiner*—Reinaldo P. Machado
*Assistant Examiner*—Alvin Chin-Shue

*Attorney, Agent, or Firm*—Schwartz, Jeffery, Schwaab, Mack, Blumenthal & Evans

[57] ABSTRACT

A liquid-filled type vibration damping structure consisting of a liquid-filled vibration isolator and a bracket member in which the liquid-filled vibration isolator comprises first and second frames each to be mounted on a vibration source side such as power unit and on a vehicle body side, a resilient member provided between the first and second frames, a baffle member secured on the first frame and dividing the internal space surrounded by the resilient member, a diaphragm and one of the frames into two liquid chambers, said baffle member further having a ring-shaped orifice portion so as to damp a low frequency band vibration through the orifice portion. The liquid-filled vibration isolator further comprises a movable plate placed within an enclosure formed between the baffle member and at least one auxiliary plate having an aperture at the center thereof respectively so as to communicate with the two liquid chamber and to damp a high frequency band vibration, and at least one mass body attached to the resilient member. With this construction, the residual frequency peak of a first vibration transmission characteristic caused by the movable plate according to the prior art can be effectively cancelled by a bottoming frequency of a second vibration transmission characteristic due to the mass body and the resilient member, in accordance with the adjustment of the angle of inclination of the bracket member and the mass body, thereby preventing a booming sound or confined sound inside a vehicle from occuring and obtaining quietness inside the vehicle.

5 Claims, 6 Drawing Figures

LIQUID-FILLED TYPE VIBRATION DAMPING STRUCTURE

BACKGROUND OF THE INVENTION (1) Field of the Invention

The present invention relates to a liquid-filled type vibration damping structure for effectively damping or isolating a vibration by the damping effect of liquid, and more particularly to a liquid-filled type vibration damping structure in which a residual frequency peak of a vibration transmission characteristic caused by a movable plate can be cancelled by a bottoming frequency portion of an another vibration transmission characteristic of a liquid-filled vibration isolator.

(2.) Description of the Prior Art

A liquid-filled type vibration isolator is, in general, constituted by dividing into two liquid chambers the internal space of a resilient member provided between a pair of frames by means of a baffle member attached to one of the frames and by defining an orifice through the baffle for communication between the two liquid chambers. Such a vibration isolator is provided between a power unit and a vehicle body in mounting the former on the latter.

The conventional liquid-filled type vibration isolator is designed to damp a high-frequency vibration through the vibration of the baffle member with a movable plate provided, as disclosed in Japanese Patent Disclosure No. 5376/1978. That is the orifice defined through the baffle provides the effect of a damper to damp a vibration between two liquid chambers upon a low-frequency band vibration being transmitted from the power unit.

On the other hand, a high-frequency band vibration from the power unit is damped by the vibration of movable plate permitting an extremely small voluminal change between two liquid chambers and by the vibration absorbing effect of the resilient member.

In such a liquid-filled type vibration isolator, however, a portion of the liquid present in the moving range of the movable plate is caused to form a sort of mass body for generating a liquid column resonance upon the movable plate vibrated as a result of high-frequency band vibration, and thereby producing a vibration transmission characteristic A shown in FIG. 1. That is, while such a vibration transmission characteristic A shows an effective vibration damping result around the frequency of 100 Hz, it causes a substantially large frequency peak P to appear around the frequency of 200 Hz, thereby generating a booming sound confined sound inside a vehicle.

To solve such a problem, it may be proposed that the resilient member of a liquid-filled type vibration isolator is provided with a mass body to utilize a vibration transmitted under the mass damping effect of mass body caused by the spring action of resilient member in cancelling the frequency peak P. In this proposal, however, the need for the resilient member to support the static load of power unit itself prevents the resilient member from employing a small spring constant.

To this end, the mass body must have a substantially enlarged mass to provide a sufficient mass damping effect. This naturally results in a vibration isolator having an increased dimensional and weight requirement such that it would be impractical for actual application.

SUMMARY OF THE INVENTON

It is therefore an object of the present invention to provide a liquid-filled type vibration damping structure in which the transmission of vibration from a vibration source to a vehicle body can be effectively lowered.

It is an another object of the present invention to provide a liquid-filled type vibration damping structure in which the generation of the booming sound can be effectively reduced so as to obtain improved quietness inside a vehicle can be obtained.

It is a still another object of the present invention to provide a liquid-filled type vibration damping structure in which the peak-frequency caused by a liquid column resonance during the vibration of a movable plate of a liquid-filled vibration isolator can be effectively cancelled by a bottoming frequency due to a mass body and the angle of inclination of the liquid-filled vibration isolator.

It is a yet another object of the present invention to provide liquid-filled type vibration damping structure having a desired vibration transmission characteristic without the need for providing a vibration isolator with increased dimension and weight, by extracting from the resilient member an element serving to reduce a spring constant, thereby vibrating the mass body with a small spring constant and suppressing the frequency peak which would otherwise take place in conjunction with the liquid column resonance during the vibration of the movable plate.

One of the objects of the present invention is obtained by providing a liquid-filled type vibration damping structure comprising: a liquid-filled vibration isolator having first and second frames to be mounted on a vibration source side such as power unit and on a vehicle body side respectively; a resilient member provided between the first and second frames; a diaphragm secured at the first frame; a baffle member secured on the first frame and dividing the internal space surrounded by the resilient member, the diaphragm, and one of the frames, into two liquid chambers, the baffle member further having an orifice portion formed between the baffle member and at least one auxiliary plate provided on one side of the baffle member so as to damp a low frequency band vibration through the orifice portion, apertures being formed substantially at the center of the baffle member and the auxiliary plate respectively so as to communicate with the two liquid chambers; and at lease one mass body attached at the resilient member substantially parallel with the first and second frames; and a bracket member for mounting the vibration isolator between the vibration source and the vehicle body at a predetermined angle of inclination against the direction of vibration from the vibration source; thereby effectively cancelling the residual frequency peak of a first vibration transmission characteristic caused by the movable plate of a second vibration transmission characteristic in accordance with the angle of inclination and the mass body attached to the resilient member.

According to one embodiment of the present invention, the shearing direction spring constant of the resilient member acts upon the mass body, and because of its direction of action, i.e., the shearing direction the spring constant is rendered down to an extremely small value. Accordingly, the bottoming frequency of the mass body relative to the spring constant occuring during the application of mass damping effect can be made substantially equal to the peak-frequency caused by the liquid column resonance during the vibration of the movable plate. In consequence, the peak-frequency is cancelled by the bottoming frequency and the transmission of vibration can be substantially reduced.

These and other objects, features and advantages of the present invention will be better understood from the following description about embodiments with reference to the accompanying drawings.

DESCRIPTION OF THE PREFERRED EMBODIMENTS

Figure 2:
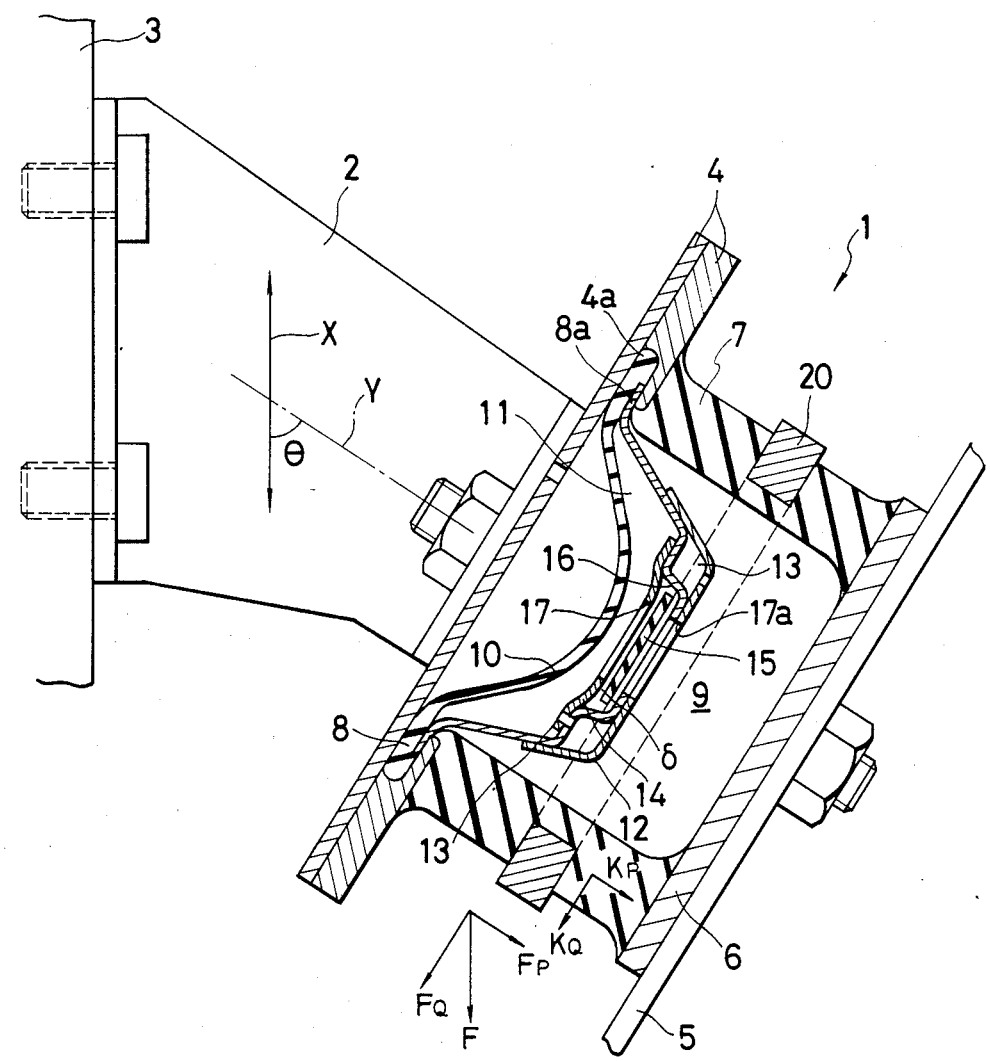
FIG. 2 is a cross-sectional view of a liquid-filled type vibration damping structure of one embodiment according to the present invention.

Referring to FIG. 2, there is shown by way of example, a liquid-filled type vibration damping structure for use in supporting a power unit of a vehicle. The liquid-filled type vibration damping structure consists of two portions; one is a liquid-filled vibration isolator 1 and a bracket member 2 which is mounted to the power unit 3 as a vibration source at a predetermined angle of inclination against the direction of vibration of the power unit 3.

The liquid-filled vibration isolator comprises a first frame 4 for attachment to the power unit 3 via the bracket member 2, and a second frame 6 for attachment to a vehicle body 5. A resilient member 7 formed of hollow rubber or the like is secured in place by a vulcanised adhesive or the like between the first and the second frames 4 and 6. The hollow space of the resilient member 7 is divided by a baffle 8 supported on the first frame 4. The second frame side hollow space divided by the baffle is designated as the first liquid chamber 9. The first side comparatment formed by the baffle 8 is closed by means a resilient member or a diaphragm 10. A compartment formed between the diaphragm 10 and the baffle 8 is designated as a second liquid chamber 11. A non-compressible type fluid such as water and the like is filled in first and second liquid chambers 9 and 11 respectively.

The baffle 8 has a substantially inverted trapezoidal cross-section. A flange portion 8a formed along the upper periphery of baffle 8 is made engageablly attachable in an annular recess 4a formed along the first frame 4, in conjunction with the periphery of diagram 10. A first auxiliary plate 12 is secured in place below the bottom of baffle 8. An annular orifice 13 is defined between the baffle 8 and the first auxiliary plate 12 for communication between the first and the second liquid chambers 9 and 11. A liquid is caused to move via the orifice 13 between the first and the second liquid chambers 9 and 11 in response to the voluminal change of the first liquid chamber 9 caused by the deformation of the resilient member 7. At this moment, the resistance to liquid flow through the orifice serves to produce a damping effect. Furthermore, a second auxiliary plate 14 is secured in place above the bottom of baffle 8. Defined between the second auxiliary plate 14 and the baffle 8 is a movable plate 15, whose enclosure 16 is placed in an inward portion surrounded by the annular orifice 13. The inner height of this enclosure 16 is selected such that the movable plate 15 enclosed may move slightly in the direction of the first and the second liquid chambers 9 and 11, and a clearance $\sigma$ may be formed between it and the movable plate 15. The interior of enclosure 16 is communicated with the first and the second liquid chambers 9 and 11 via openings 17 and 17a formed in the second auxiliary plate 14, the baffle 8 and the first auxiliary plate 12. Meanwhile, the diameters of the openings 17 and 17a are selected such that they are smaller than that of the movable plate 15, but are large enough to suppress the orifice effect.

In this embodiment, an annular mass body 20 is embedded and secured in place by a vulcanised adhesive or the like in the outer periphery of the resilient member along a substantial intermediate portion of its upstanding length in such a way that the compressible direction of the resilient member, or the central axis direction Y of vibration isolator 1 is inclined in an angle $\theta$ relative to the vibrating direction X of the power unit 3.

In the liquid-filled vibration isolator 1 as embodied above, the internal volume of the first liquid chamber 9 tends to vary substantially in response to the deformation of the resilient member 7, where a low-frequency band vibration is generated from the power unit 3 during idling and the like. The varied internal volume of the first liquid chamber 9 is in turn transmitted by a liquid via the orifice 13 to establish a pressure equilibrium between the first and second liquid chambers 9 and 11. The resistance to the flow of liquid passing through the orifice 13 serves to upsets the pressure equilibrium, and thereby allows for the damping effect of mass body. Thus, it becomes possible to damp the low-frequency band vibration transmitted from the power unit.

On the other hand, when a high-frequency band vibration is generated with a small amplitude from the power unit 3 during the high speed rotation of engine, as in the case of driving a vehicle and the like, the liquid is not caused to move through the orifice 13 and in turn a sort of rigid body or a solid condition is formed inside the first and second liquid chambers 9 and 11. Accordingly, the high-frequency band vibration cannot be damped through the orifice 13 and is transmitted to the vehicle body 5 at a reduced rate under the vibration absorbing action of resilient member 7 itself and the internal vibration of movable plate 15's enclosure 16. That is, the high-frequency band vibration is transmitted from the power unit 3 to the first frame 4 so as to vibrate the frame 4 in conjunction with the baffle 8, the vibration of which is transmitted via rigid body-like liquids in the first and second liquid chambers 9 and 11 to the second frame 6 and the vehicle body 5. However, since the movable plate 15 can be vibrated independent in relative to the baffle 8, the vibration energy transmitted from the baffle 8 to the liquid can be absorbed by the movement of the movable plate 15.

Figure 1:
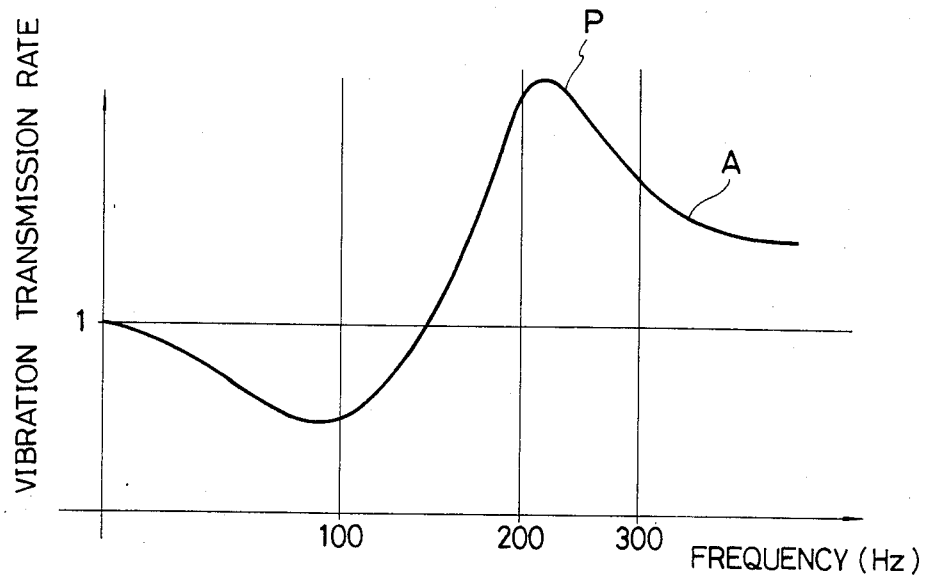
FIG. 1 is a characteristic of the vibration transmission due to a movable plate of the liquid-filled type vibration isolator according to the prior art.

As pointed out in the foregoing description as a prior art problem, when the movable plate 15 is relatively vibrated within the enclosure 16, unless the Y-axis is inclined at the angle of θ with respect to the direction of vibration X, with a portion of liquid displaced by the vibration of the movable plate as a mass body, a liquid column resonance is generated. As a result, the frequency peak P is generated in the vicinity of the frequency of 200 Hz in the vibration transmission characteristic A as shown in FIG. 1.

Figure 3:
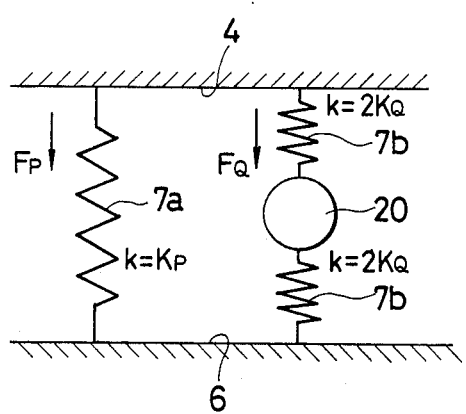
FIG. 3 is an equivalent mechanical model diagram of the liquid-filled type vibration damping structure shown in FIG. 2.

Since the vibration isolator according to the present invention has its central axis direction Y inclined towards the vibrating direction S as embodied herein, a load $F_p$ and a load $F_Q$ are applied in the compressible and shearing direction respectively the resilient member 7, as a partial force. Hence, the mass body 20 receives the imposition of a large spring constant $K_p$ in the compressible direction and small spring constant $K_Q$ in the shearing direction of the resilient member. In other words, such spring constants are split into two components 7a and 7b as schematically shown in FIG. 3. Though the mass body 20 is actually connected to the compressible direction spring 7a, it is omitted in FIG. 3, as its substantially larger spring constant $K_p$ as compared with that of $K_Q$ of the shearing direction spring (by a factor of about five) may substantially liberate it from the influence of the mass body.

Figure 4:
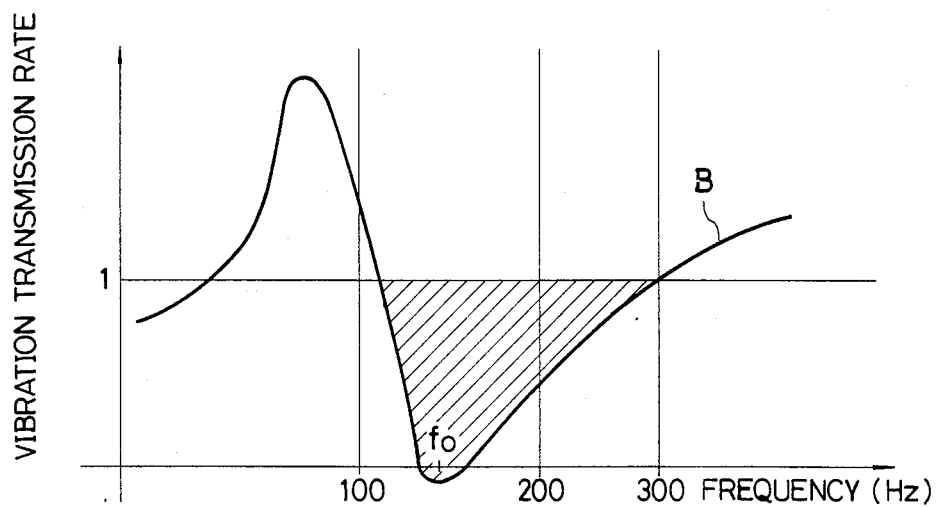
FIG. 4 is a vibration transmission characteristic of the resilient member having the mass body according to the present invention.

In consequence, the mass body 20 is caused to act as a mass damper by the shearing direction spring 7b, and its resultant vibration can show the vibration transmission characteristic B of FIG. 4 despite the influencial act of compressible direction spring 7a. The mass body 20 and the vibration isolator 1 have their angle of inclination selected such that the bottom frequency (shaded in the diagram) of vibration transmission characteristic B may be made substantially equal to the frequency peak P or around the frequency of 200 Hz in the approximately must be established. The present invention is embodied such that the shearing direction spring 7b, having its spring constant substantially lowered, is acted upon the mass body 20 with the angle of inclination θ. Accordingly, the bottoming frequency can be made substantially equal to the frequency peak P, as expressed by the equation T,0100 (k: spring constant, m: mass), despite the reduction of mass body 20 in weight.

Figure 5:
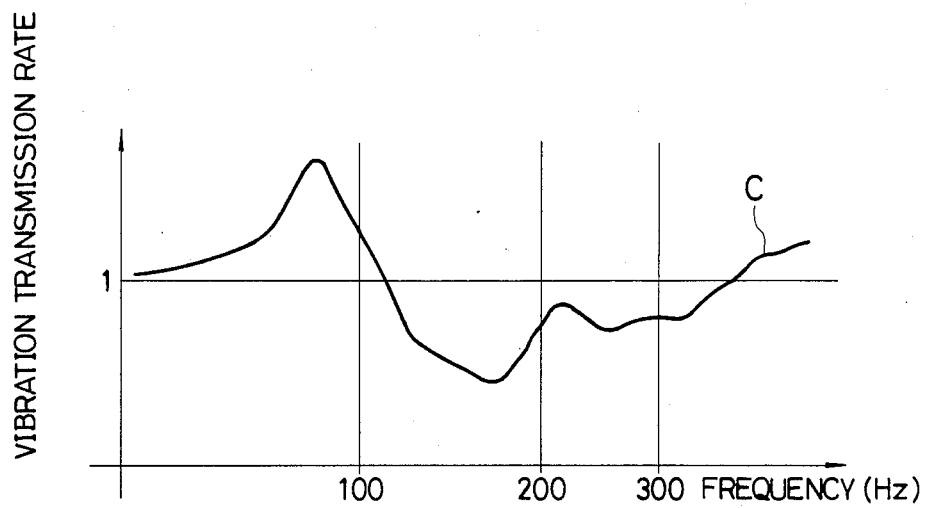
FIG. 5 is a total vibration transmission characteristic of the liquid-filled type vibration damping structure according to the present invention.

A vibration transmission characteristic C as show in FIG. 5 can be obtained, by combining the vibration transmission characteristic B and the vibration transmission characteristic A caused by the movable plate 15, the former characteristic A being dependant on the relationship between the shearing direction spring 7b and the mass body 20 and by the compressible direction spring 7a. That is, the vibration characteristic C represents the transmittivity of vibration or vibration transmission rate transmitted from the power unit 3 to the vehicle body 5 via the vibration isolator 1, and the frequency peak P of vibration transmission characteristic A caused by the movable plate 15 is cancelled by the bottoming frequency portion. As a result, it becomes possible to substantially suppress the transmission of vibration having a frequency band which would generate a booming sound or confined sound to the vehicle body 5.

Figure 6:
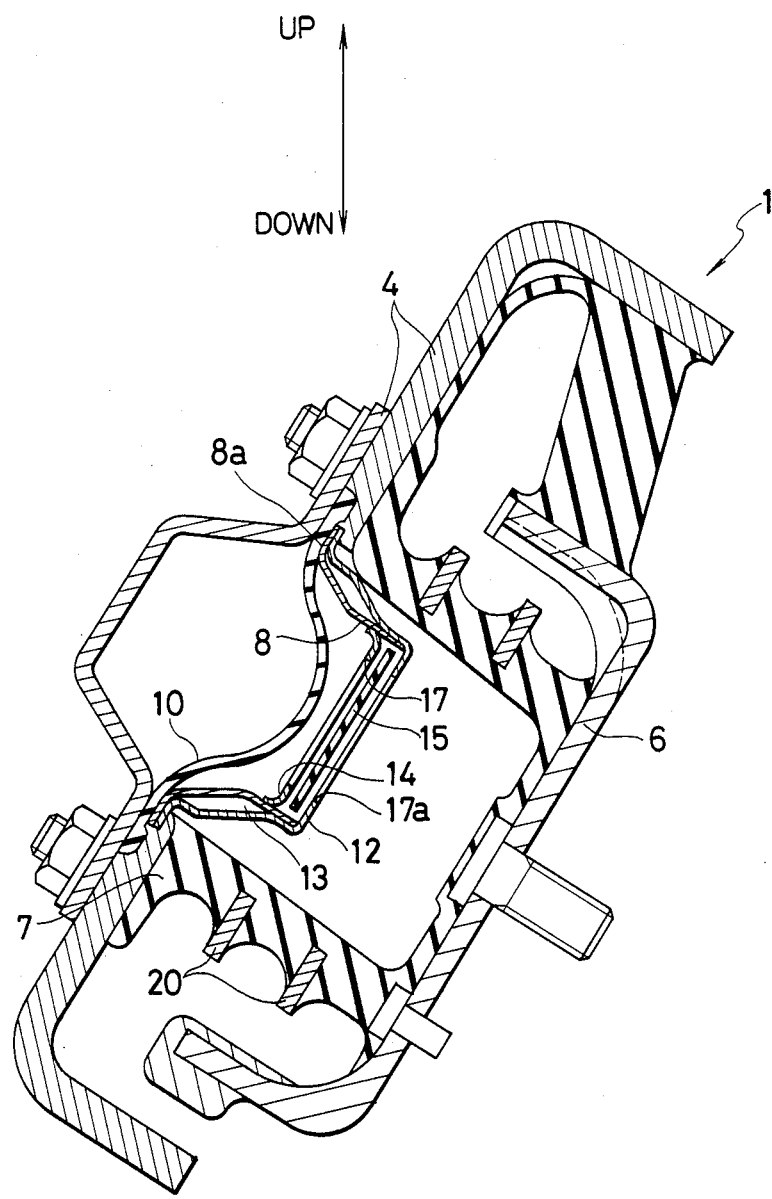
FIG. 6 is a second embodiment of the liquid-filled type vibration damping structure according to the present invention.

It has been confirmed that the liquid-filled vibration isolator 1 of this embodiment can suppress the frequency peak P most effectively with the angle of inclination θ=45°. FIG. 6 shows an alternative embodiment of this invention, wherein similar numerals are used to indicate similar parts of above described embodiment. Detailed description of such parts are omitted. That is, this embodiment is different from that of the FIG. 2 embodiment in that the mass body 20 is split into two sections, i.e., upper and lower sections. By spliting the mass body into upper and lower sections, this embodiment permits the resilient member 7 to improve its voluminal changing ratio with the resiliency in the direction of expansion reduced, and thereby increasing the damping force of resilient member 7. Other functions and effects of this embodiment are identical to those of first embodiment. As described in the foregoing, the liquid-filled type vibration damping structure according to the present invention is formed such that the frequency peak of the vibration characteristic, which is caused by the movable plate and which generates a booming sound, is cancelled by the relationship between the inclined shearing direction spring of the resilient member and a mass body associated with the same resilient member and by the bottoming frequency of the frequency characteristic established by the compressible direction spring of resilient member. Thus, the generation of the booming sound or confined sound within the vehicle body can be substantially reduced or avoided, thereby greatly improving quietness inside the vehicle.

When achieving the agreement of the bottoming frequency to the frequency peak of the vibration transmission characteristic due to the movable plate, a small spring constant is exerted on the resilient member in the direction of shearing and therefore the mass body can be advantageously reduced in weight.

While the invention has been described in its preferred emtodiment, it is to be understood that the words which have been used are words of description rather than limitation and that various changes and modification may be made within the purview of the appended claims without departing from the true scope and spirit of the invention in its broader aspects.

What is claimed is:

1. A liquid-filled type vibration damping structure comprising:
  a liquid-filled vibration isolator having
  (a) first and second frames respectively mounted on a vibration source and on the side of a vehicle body;
  (b) a resilient member connected between said first and second frames;
  (c) a diaphragm secured to the first frame;
  (d) a baffle member secured onto the first frame and dividing an internal space surrounded by said resilient member, said diaphragm, and the second frame into first and second liquid chambers, said baffle member further having a hole and a first aperture for communicating said first and second liquid chambers with each other;
  (e) a holder cooperating with the baffle member to form therebetween an orifice portion communicated with the hole of the baffle member and having at least one aperture aligned with the first aperture of the baffle member;
  (f) a movable plate held by at least the holder between the apertures of the holder and the baffle member and moved with respect to the baffle member by the liquid flow through the apertures of the holder and the baffle member, each aperture of the holder and the baffle member having a predetermined diameter smaller than the diameter of the movable plate; and (g) at least one mass body attached into the resilient member to reduce the resilient coefficient thereof, said structure further comprising:

a bracket member for mounting said vibration isolator onto said vibration source at a predetermined angle of inclination with respect to the direction of vibration from said vibration source, said angle being sufficient to suppress the generation of a liquid column resonance peak.

2. A liquid-filled type vibration damping structure as claimed in claim 1, wherein said predetermined angle of inclination is 45°.

3. A liquid-filled type vibration damping structure as claimed in claim 1, wherein said resilient member and said mass body are formed in an annular shape, and said mass body is attached to the outer periphery of said resilient member, and said orifice portion is formed in an annular shape.

4. A liquid-filled type vibration damping structure as claimed in claim 1, wherein said holder is disposed in the second liquid chamber and comprises an enclosure secured to the baffle member and having an aperture, and an auxiliary plate secured to the enclosure and having an aperture, and said movable plate is movably disposed between the enclosure and the auxiliary plate, and said orifice portion is defined by the enclosure and the baffle member.

5. A liquid-filled type vibration damping structure as claimed in claim 1, wherein said baffle member has a generally trapezoidal cross-section.

* * * * *